US007244802B2

(12) United States Patent
Dewanjee

(10) Patent No.: US 7,244,802 B2
(45) Date of Patent: *Jul. 17, 2007

(54) THERMOSETTING POLYURETHANE MATERIAL FOR A GOLF BALL

(75) Inventor: Pijush K. Dewanjee, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 10/711,269

(22) Filed: Sep. 7, 2004

(65) Prior Publication Data

US 2005/0020796 A1    Jan. 27, 2005

Related U.S. Application Data

(63) Continuation-in-part of application No. 10/064,721, filed on Aug. 9, 2002, now Pat. No. 6,787,626, which is a continuation-in-part of application No. 10/063,979, filed on May 31, 2002, now abandoned.

(51) Int. Cl.
  *A63B 37/12* (2006.01)
(52) U.S. Cl. .......................... 528/64; 528/76; 473/374; 473/378
(58) Field of Classification Search ..................... None
  See application file for complete search history.

(56) References Cited

U.S. PATENT DOCUMENTS

| | | | |
|---|---|---|---|
| 2,940,128 A | 6/1960 | Bowerman et al. |
| 3,034,791 A | 5/1962 | Gallagher |
| 3,112,521 A | 12/1963 | Ward |
| 3,130,102 A | 4/1964 | Ford et al. |
| 3,147,324 A | 9/1964 | Watson et al. |
| 3,177,280 A | 4/1965 | Ford et al. |
| 3,616,101 A | 10/1971 | Satchell et al. |
| 3,979,126 A | 9/1976 | Dusbiber |
| 3,989,568 A | 11/1976 | Isaac |
| 4,062,825 A | 12/1977 | Watabe et al. |
| 4,123,061 A | 10/1978 | Dusbiber |
| 4,203,941 A | 5/1980 | Brooker |
| 4,248,432 A | 2/1981 | Hewitt et al. |
| 4,274,637 A | 6/1981 | Molitor |
| 4,349,657 A | 9/1982 | Holloway |
| 4,431,193 A | 2/1984 | Nesbitt |
| 4,631,298 A | 12/1986 | Presswood |
| 4,650,193 A | 3/1987 | Molitor et al. |
| 4,674,170 A | 6/1987 | Hubbert et al. |
| 4,674,751 A | 6/1987 | Molitor et al. |
| 4,959,000 A | 9/1990 | Giza |
| 5,006,297 A | 4/1991 | Brown et al. |
| 5,033,750 A | 7/1991 | Yamagishi et al. |
| 5,098,105 A | 3/1992 | Sullivan |
| 5,112,556 A | 5/1992 | Miller |
| 5,159,053 A | 10/1992 | Kolycheck et al. |
| 5,334,673 A | 8/1994 | Wu |
| 5,484,870 A | 1/1996 | Wu |
| 5,688,191 A | 11/1997 | Cavallaro et al. |
| 5,692,974 A | 12/1997 | Wu et al. |
| 5,703,193 A | 12/1997 | Rosenberg et al. |
| 5,714,546 A | 2/1998 | Egashira et al. |
| 5,733,428 A | 3/1998 | Calabria |
| 5,779,562 A | 7/1998 | Melvin et al. |
| 5,803,831 A | 9/1998 | Sullivan et al. |
| 5,803,834 A | 9/1998 | Yamagishi et al. |
| 5,885,172 A | 3/1999 | Hebert et al. |
| 5,888,437 A | 3/1999 | Calabria et al. |
| 5,897,884 A | 4/1999 | Calabria et al. |
| 5,908,358 A | 6/1999 | Wu |
| 5,929,189 A | 7/1999 | Ichikawa et al. |
| 5,935,021 A | 8/1999 | Kashiwagi et al. |
| 5,947,843 A | 9/1999 | Calabria et al. |
| 5,961,401 A | 10/1999 | Masutani et al. |
| 5,971,870 A | 10/1999 | Sullivan et al. |
| 5,971,871 A | 10/1999 | Sullivan et al. |
| 5,984,806 A | 11/1999 | Sullivan et al. |
| 6,015,356 A | 1/2000 | Sullivan et al. |
| 6,037,419 A | 3/2000 | Takesue et al. |
| 6,042,488 A | 3/2000 | Sullivan et al. |
| 6,042,768 A | 3/2000 | Calabria et al. |
| 6,054,550 A | 4/2000 | Umezawa et al. |
| 6,057,403 A | 5/2000 | Sullivan et al. |
| 6,117,024 A | 9/2000 | Dewanjee |
| 6,126,558 A | 10/2000 | Higuchi et al. |
| 6,190,268 B1 | 2/2001 | Dewanjee |
| 6,309,313 B1 | 10/2001 | Peter |
| 6,435,987 B1 | 8/2002 | Dewanjee |
| 6,476,176 B1 | 11/2002 | Wu |

(Continued)

OTHER PUBLICATIONS

David House, The Versatility of UOP Unilink and Clearlink Diamines in Polyurethane and Polyurea Systems, UTECH Asia 1996 Conference Paper, p. 1-16.*

*Primary Examiner*—David J. Buttner
(74) *Attorney, Agent, or Firm*—Michael A. Catania; Elaine H. Lo

(57) ABSTRACT

A curative blend for a thermosetting polyurethane material that allows for a polyurethane material with greater durability is disclosed herein. The curative blend is composed of 4,4'-methylenebis-(2,6-diethyl)-aniline and a second curing agent selected from the group consisting of N,N'-bis-alkyl-p-phenylenediamine, N,N'-dialkylamino-diphenylmethane with tetrapropoxylated ethylenediamine and an aliphatic diamine. A preferred polyurethane prepolymer is polytetramethylene ether glycol terminated toluene diisocyanate prepolymer. The thermosetting polyurethane is preferably utilized as a cover for a golf ball. The cover is preferably formed over a core and boundary layer.

1 Claim, 1 Drawing Sheet

U.S. PATENT DOCUMENTS

| | | |
|---|---|---|
| 6,482,345 B1 | 11/2002 | Dewanjee |
| 6,486,261 B1 * | 11/2002 | Wu et al. ................ 525/332.6 |
| 6,506,851 B2 | 1/2003 | Wu |
| 6,511,388 B1 | 1/2003 | Dewanjee |
| 6,518,358 B1 | 2/2003 | Wu |
| 6,528,578 B2 | 3/2003 | Wu |
| 6,530,849 B2 | 3/2003 | Peter |
| 6,762,273 B2 * | 7/2004 | Dewanjee .................... 528/64 |
| 6,787,626 B2 * | 9/2004 | Dewanjee .................... 528/64 |
| 2003/0064826 A1 * | 4/2003 | Voorheis et al. ............ 473/367 |
| 2003/0171166 A1 * | 9/2003 | Cavallaro et al. ........... 473/371 |
| 2003/0203771 A1 * | 10/2003 | Rosenberg et al. ......... 473/371 |
| 2006/0111541 A1 * | 5/2006 | Dewanjee .................... 528/64 |

\* cited by examiner

THERMOSETTING POLYURETHANE MATERIAL FOR A GOLF BALL

CROSS REFERENCES TO RELATED APPLICATIONS

The Present Application is a continuation-in-part application of U.S. patent application Ser. No. 10/064,721, filed on Aug. 9, 2002, now U.S. Pat. No. 6,787,626, which is a continuation-in-part application of U.S. patent application Ser. No. 10/063,979, filed on May 31, 2002, now abandoned.

BACKGROUND OF THE INVENTION

1. Field of the Invention

The present invention relates to a thermosetting polyurethane material. More specifically, the present invention relates to a thermosetting polyurethane material for a cover of a golf ball.

2. Description of the Related Art

Conventionally golf balls are made by molding a cover around a core. The core may be wound or solid. A wound core typically comprises elastic thread wound about a solid or liquid center. Unlike wound cores, solid cores do not include a wound elastic thread layer. Solid cores typically may comprise a single solid piece center or a solid center covered by one or more mantle or boundary layers of material.

The cover may be injection molded, compression molded, or cast over the core. Injection molding typically requires a mold having at least one pair of mold cavities, e.g., a first mold cavity and a second mold cavity, which mate to form a spherical recess. In addition, a mold may include more than one mold cavity pair.

In one exemplary injection molding process each mold cavity may also include retractable positioning pins to hold the core in the spherical center of the mold cavity pair. Once the core is positioned in the first mold cavity, the respective second mold cavity is mated to the first to close the mold. A cover material is then injected into the closed mold. The positioning pins are retracted while the cover material is flowable to allow the material to fill in any holes caused by the pins. When the material is at least partially cured, the covered core is removed from the mold.

As with injection molding, compression molds typically include multiple pairs of mold cavities, each pair comprising first and second mold cavities that mate to form a spherical recess. In one exemplary compression molding process, a cover material is pre-formed into half-shells, which are placed into a respective pair of compression mold cavities. The core is placed between the cover material half-shells and the mold is closed. The core and cover combination is then exposed to heat and pressure, which cause the cover half-shells to combine and form a full cover.

As with the above-referenced processes, a casting process also utilizes pairs of mold cavities. In a casting process, a cover material is introduced into a first mold cavity of each pair. Then, a core is held in position (e.g. by an overhanging vacuum or suction apparatus) to contact the cover material in what will be the spherical center of the mold cavity pair. Once the cover material is at least partially cured (e.g., a point where the core will not substantially move), the core is released, the cover material is introduced into a second mold cavity of each pair, and the mold is closed. The closed mold is then subjected to heat and pressure to cure the cover material thereby forming a cover on the core. With injection molding, compression molding, and casting, the molding cavities typically include a negative dimple pattern to impart a dimple pattern on the cover during the molding process.

Materials previously used as golf ball covers include balata (natural or synthetic), gutta-percha, ionomeric resins (e.g., DuPont's SURLYN®), and polyurethanes. Balata is the benchmark cover material with respect to sound (i.e. the sound made when the ball is hit by a golf club) and feel (i.e. the sensation imparted to the golfer when hitting the ball). Natural balata is derived from the Bully Gum tree, while synthetic balata is derived from a petroleum compound. Balata is expensive compared to other cover materials, and golf balls covered with balata tend to have poor durability (i.e. poor cut and shear resistance). Gutta percha is derived from the Malaysian sapodilla tree. A golf ball covered with gutta percha is considered to have a harsh sound and feel as compared to balata covered golf balls.

Ionomeric resins, as compared to balata, are typically less expensive and tend to have good durability. However, golf balls having ionomeric resin covers typically have inferior sound and feel, especially as compared to balata covers.

A golf ball with a polyurethane cover generally has greater durability than a golf ball with a balata cover. The polyurethane covered golf ball generally has a better sound and feel than a golf ball with an ionomeric resin cover. Polyurethanes may be thermoset or thermoplastic. Polyurethanes are formed by reacting a prepolymer with a polyfunctional curing agent, such as a polyamine or a polyol. The polyurethane prepolymer is the reaction product of, for example, a diisocyanate and a polyol such as a polyether or a polyester. Several patents describe the use of polyurethanes in golf balls. However, golf balls with polyurethane covers usually do not have the distance of other golf balls such as those with covers composed of SURLYN® materials.

Gallagher, U.S. Pat. No. 3,034,791 discloses a polyurethane golf ball cover prepared from the reaction product of poly(tetramethylene ether) glycol and toluene-2,4-diisocyanates (TDI), either pure TDI or an isomeric mixture.

Isaac, U.S. Pat. No. 3,989,568 ("the '568 patent) discloses a polyurethane golf ball cover prepared from prepolymers and curing agents that have different rates of reaction so a partial cure can be made. The '568 patent explains that "the minimum number of reactants is three." Specifically, in '568 patent, two or more polyurethane prepolymers are reacted with at least one curing agent, or at least one polyurethane prepolymer is reacted with two or more curing agents as long as the curing agents have different rates of reaction. The '568 patent also explains that "[o]ne of the great advantages of polyurethane covers made in accordance with the instant invention is that they may be made very thin . . . ", and "[t]here is no limitation on how thick the cover of the present invention may be but it is generally preferred . . . that the cover is no more than about 0.6 inches in thickness." The examples in the '568 patent only disclose golf balls having covers that are about 0.025 inches thick.

Similar to Isaac, PCT International Publication Number WO 99/43394 to Dunlop Maxfli Sports Corporation, discloses using two curing agents to control the reaction time for polyurethane formation. The two curing agents are a dimethylthio 2,4-toluenediamine and diethyl 2,4-toluenediamine, which are blended to control the reaction rate of a toluene diisocyanate based polyurethane prepolymer or a 4,4'-diphenylmethane diisocyanate based polyurethane prepolymer.

Dusbiber, U.S. Pat. No. 4,123,061 ("the '061 patent") discloses a polyurethane golf ball cover prepared from the reaction product of a polyether, a diisocyanate and a curing agent. The '061 patent discloses that the polyether may be polyalkylene ether glycol or polytetramethylene ether glycol. The '061 patent also discloses that the diisocyanate may be TDI, 4,4'-diphenylmethane diisocyanate ("MDI"), and 3,3'-dimethyl-4,4'-biphenylene diisocyanate ("TODI"). Additionally, the '061 patent discloses that the curing agent may be either a polyol (either tri- or tetra-functional and not di-functional) such as triisopropanol amine ("TIPA") or trimethoylol propane ("TMP"), or an amine-type having at least two reactive amine groups such as: 3,3' dichlorobenzidene; 3,3' dichloro 4,4' diamino diphenyl methane ("MOCA"); N,N,N',N' tetrakis (2-hydroxy propyl) ethylene diamine; or Uniroyal's Curalon L which is an aromatic diamine mixture.

Hewitt, et al., U.S. Pat. No. 4,248,432 ("the '432 patent") discloses a thermoplastic polyesterurethane golf ball cover formed from a reaction product of a polyester glycol (molecular weight of 800–1500) (aliphatic diol and an aliphatic dicarboxylic acid) with a para-phenylene diisocyanate ("PPDI") or cyclohexane diisocyanate in the substantial absence of curing or crosslinking agents. The '432 patent teaches against the use of chain extenders in making polyurethanes. The '432 patent states, "when small amounts of butanediol-1,4 are mixed with a polyester . . . the addition results in polyurethanes that do not have the desired balance of properties to provide good golf ball covers. Similarly, the use of curing or crosslinking agents is not desired . . ."

Holloway, U.S. Pat. No. 4,349,657 ("the '657 patent") discloses a method for preparing polyester urethanes with PPDI by reacting a polyester (e.g. prepared from aliphatic glycols having 2–8 carbons reacted with aliphatic dicarboxylic acids having 4–10 carbons) with a molar excess of PPDI to obtain an isocyanate-terminated polyester urethane (in liquid form and stable at reaction temperatures), and then reacting the polyester urethane with additional polyester. The '657 patent claims that the benefit of this new process is the fact that a continuous commercial process is possible without stability problems. The '657 patent further describes a suitable use for the resultant material to be golf ball covers.

Wu, U.S. Pat. No. 5,334,673 ("the '673 patent") discloses a polyurethane prepolymer cured with a slow-reacting curing agent selected from slow-reacting polyamine curing agents and difunctional glycols (i.e., 3,5-dimethylthio-2,4-toluenediamine, 3,5-dimethylthio-2,6-toluenediamine, N,N'-dialkyldiamino diphenyl methane, trimethyleneglycol-di-p-aminobenzoate, polytetramethyleneoxide-di-p-aminobenzoate, 1,4-butanediol, 2,3-butanediol, 2,3-dimethyl-2,3-butanediol, ethylene glycol, and mixtures of the same). The polyurethane prepolymer in the '673 patent is disclosed as made from a polyol (e.g., polyether, polyester, or polylactone) and a diisocyanate such as MDI or TODI. The polyether polyols disclosed in the '673 patent are polytetramethylene ether glycol, poly(oxypropylene) glycol, and polybutadiene glycol. The polyester polyols disclosed in the '673 patent are polyethylene adipate glycol, polyethylene propylene adipate glycol, and polybutylene adipate glycol. The polylactone polyols disclosed in the '673 patent are diethylene glycol initiated caprolactone, 1,4-butanediol initiated caprolactone, trimethylol propane initiated caprolactone, and neopentyl glycol initiated caprolactone.

Cavallaro, et al., U.S. Pat. No. 5,688,191 discloses a golf ball having core, mantle layer and cover, wherein the mantle layer is either a vulcanized thermoplastic elastomer, functionalized styrene-butadiene elastomer, thermoplastic polyurethane, metallocene polymer or blends of the same and thermoset materials.

Wu, et al., U.S. Pat. No. 5,692,974 discloses golf balls having covers and cores that incorporate urethane ionomers (i.e. using an alkylating agent to introduce ionic interactions in the polyurethane and thereby produce cationic type ionomers).

Sullivan, et al., U.S. Pat. No. 5,803,831 ("the '831 patent") discloses a golf ball having a multi-layer cover wherein the inner cover layer has a hardness of at least 65 Shore D and the outer cover layer has a hardness of 55 Shore D or less, and more preferably 48 Shore D or less. The '831 patent explains that this dual layer construction provides a golf ball having soft feel and high spin on short shots, and good distance and average spin on long shots. The '831 patent provides that the inner cover layer can be made from high or low acid ionomers such as SURLYN®, ESCOR® or IOTEK®, or blends of the same, nonionomeric thermoplastic material such as metallocene catalyzed polyolefins or polyamides, polyamide/ionomer blends, polyphenylene ether/ionomer blends, etc., (having a Shore D hardness of at least 60 and a flex modulus of more than 30000 psi), thermoplastic or thermosetting polyurethanes, polyester elastomers (e.g. HYTREL®), or polyether block amides (e.g. PEBAX®), or blends of these materials. The '831 patent also provides that the outer cover layer can be made from soft low modulus (i.e. 1000–10000 psi) material such as low-acid ionomers, ionomeric blends, non-ionomeric thermoplastic or thermosetting materials such as polyolefins, polyurethane (e.g. thermoplastic polyurethanes like TEXIN®, PELETHANE®, and thermoset polyurethanes like those disclosed in Wu, U.S. Pat. No. 5,334,673), polyester elastomer (e.g. HYTREL®), or polyether block amide (e.g. PEBAX®), or a blend of these materials.

Hebert, et al., U.S. Pat. No. 5,885,172 ("the '172 patent") discloses a multilayer golf ball giving a "progressive performance" (i.e. different performance characteristics when struck with different clubs at different head speeds and loft angles) and having an outer cover layer formed of a thermoset material with a thickness of less than 0.05 inches and an inner cover layer formed of a high flexural modulus material. The '172 patent provides that the outer cover is made from polyurethane ionomers as described in Wu, et al., U.S. Pat. No. 5,692,974, or thermoset polyurethanes such as TDI or methylenebis-(4-cyclohexyl isocyanate) ("HMDI"), or a polyol cured with a polyamine (e.g. methylenedianiline (MDA)), or with a trifunctional glycol (e.g., N,N,N',N'-tetrakis(2-hydroxpropyl)ethylenediamine). The '172 also provides that the inner cover has a Shore D hardness of 65–80, a flexural modulus of at least about 65,000 psi, and a thickness of about 0.020–0.045 inches. Exemplary materials for the inner cover are ionomers, polyurethanes, polyetheresters (e.g. HYTREL®), polyetheramides (e.g., PEBAX®), polyesters, dynamically vulcanized elastomers, functionalized styrene-butadiene elastomer, metallocene polymer, blends of these materials, nylon or acrylonitrile-butadiene-styrene copolymer.

Wu, U.S. Pat. No. 5,484,870 ("the '870 patent") discloses golf balls having covers composed of a polyurea composition. The polyurea composition disclosed in the '870 patent is a reaction product of an organic isocyanate having at least two functional groups and an organic amine having at least two functional groups. One of the organic isocyanates disclosed by the '870 patent is PPDI.

Although the prior art has disclosed golf ball covers composed of many different polyurethane materials, none of these golf balls have proven completely satisfactory. Dissatisfaction, for example, remains with processing and manufacturing the balls, especially with controlling the reaction time of the curative and prepolymer. If the "gel time" for formation of a polyurethane material is too fast, the time to place a core in a hemispherical cavity with the gelling pre-polyurethane material and to mate the hemispherical cavity with a corresponding hemispherical cavity is greatly reduced thereby leading to processing problems like air pockets, and centering of the core.

BRIEF SUMMARY OF THE INVENTION

The present invention is a more durable polyurethane material for a golf ball cover. One aspect of the present invention is a polyurethane material formed from at least one polyurethane prepolymer and curative blend composed of 4,4'-methylenebis-(2,6-diethyl)-aniline and a second curing agent selected from the group consisting of N,N'-bis-alkyl-p-phenylenediamine, N,N'-dialkylamino-diphenylmethane with tetrapropoxylated ethylenediamine and an aliphatic diamine.

DETAILED DESCRIPTION OF THE INVENTION

Figure 1:
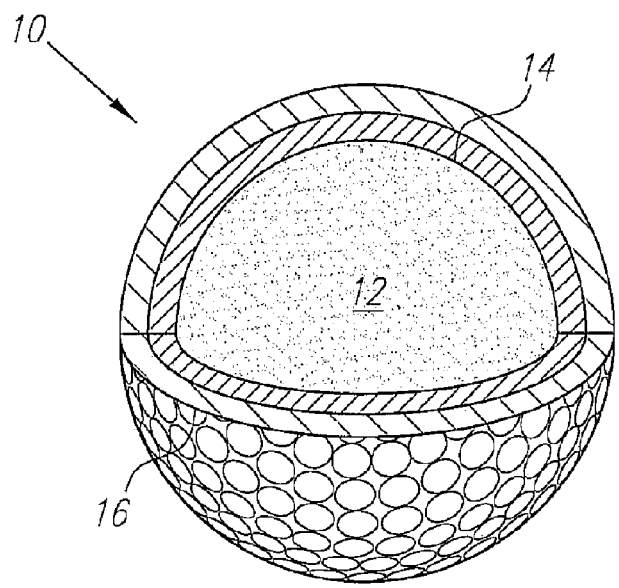
FIG. 1 illustrates a perspective view of a golf ball of the present invention including a cut-away portion showing a core, a boundary layer, and a cover.
Figure 2:
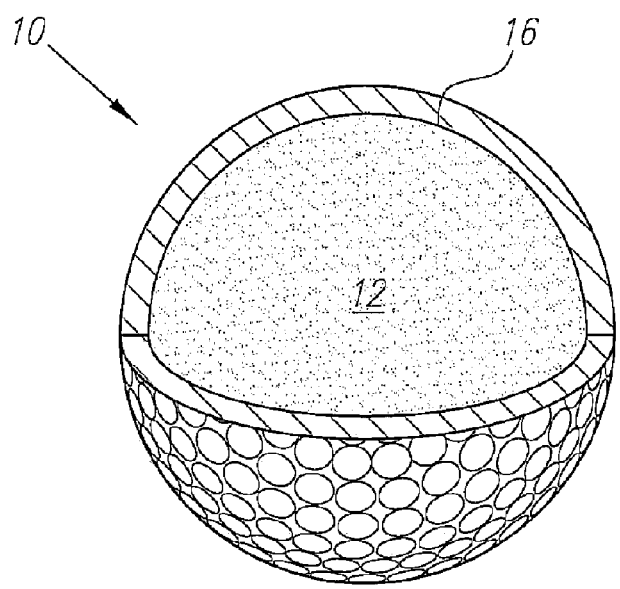
FIG. 2 illustrates a perspective view of a golf ball of the present invention including a cut-away portion core and a cover.

As illustrated in FIG. 1, a golf ball is generally indicated as 10. The golf ball 10 preferably includes a core 12, a boundary layer 14 and a cover 16. Alternatively, as shown in FIG. 2, the golf ball 10 may only include a core 12 and a cover 16. The cover 16 is composed of a thermosetting polyurethane material of the present invention. In a preferred embodiment, the cover 16 is formed over a boundary layer 14 and core 12, as shown in FIG. 1. Alternatively, the cover 16 is formed over the core 12, as shown in FIG. 2. Those skilled in the art will recognize that the core may be solid, hollow, multi-piece or liquid-filled, the boundary layer may be partitioned into additional layers, and the golf ball may have a wound layer without departing from the scope and spirit of the present invention.

The polyurethane material of the present invention is formed from reactants comprising at least one polyurethane prepolymer and a curative comprising a 4,4'-methylenebis-(2,6-diethyl)-aniline. The 4,4'-methylenebis-(2,6-diethyl)-aniline is preferably present in an amount of 25 to 75 parts per one hundred parts of the curative blend, more preferably 30 to 70 parts per one hundred parts of the curative blend, even more preferably 35 to 65 parts per one hundred parts of the curative blend, and most preferably 50 parts per one hundred parts of the curative blend. The 4,4'-methylenebis-(2,6-diethyl)-aniline has an equivalent weight of 155, and a molecular weight of 310. A preferred 4,4'-methylenebis-(2,6-diethyl)-aniline is available from LONZAGROUP under the brand name LONZACURE M-DEA.

A preferred second curative component of a curative blend used in a polyurethane material of the present invention is preferably N,N'-bis-alkyl-p-phenylenediamine, N,N'-dialkylamino-diphenylmethane with tetrapropoxylated ethylenediamine or an aliphatic diamine.

The second curative component is preferably present in an amount of 25 to 100 parts per one hundred parts of the curative blend, more preferably 25 to 75 parts per one hundred parts of the curative blend, yet more preferably 30 to 70 parts per one hundred parts of the curative blend, even more preferably 35 to 65 parts per one hundred parts of the curative blend, and most preferably 50 parts per one hundred parts of the curative blend. A preferred N,N'-bis-alkyl-p-phenylenediamine is available from UOP Company under the brand name UNILINK 4100. A preferred N,N'-dialkylamino-diphenylmethane is available from UOP Company under the brand name UNILINK-4200. A preferred N,N'-dialkylamino-diphenylmethane (80 weight percent) with ethylenediamine (20 weight percent) is available from UOP Company under the brand name UNILINK-4230. A preferred liquid aromatic diamine is available from UOP Company under the brand name UNILINK 7100. A preferred aliphatic diamine is available from UOP Company under the brand name C-1000.

The N,N'-bis-alkyl-p-phenylenediamine and N,N'-dialkylamino-diphenylmethane with tetrapropoxylated ethylenediamine are aromatic secondary diamine chain extenders for polyurethane polymers, and each has a slower rate of reaction than conventional aromatic amines. When used in a curative blend, the N,N'-bis-alkyl-p-phenylenediamine or the N,N'-dialkylamino-diphenylmethane with tetrapropoxylated ethylenediamine slows the reaction and lowers the temperature of the reaction. The N,N'-bis-alkyl-p-phenylenediamine has an equivalent weight of 110, and a molecular weight of 220. The N,N'-dialkylamino-diphenylmethane with tetrapropoxylated ethylenediamine has an equivalent weight of 130, and a molecular weight of 260.

The polyurethane prepolymer is preferably selected from toluene diisocyanate-based polyurethane prepolymers, para-phenylene diisocyanate-based polyurethane prepolymers, and 4,4'-diphenylmethane diisocyanate-based polyurethane prepolymers. The polyurethane prepolymer is preferably utilized alone or in a blend of two or three polyurethane prepolymers.

The polyurethane prepolymer is most preferably a toluene diisocyanate-based polyurethane prepolymer such as a polypropylene glycol terminated toluene diisocyanate prepolymer, polyester glycol terminated toluene diisocyanate prepolymer (nitrogen-carbon-oxygen group content ranging from 3.0% to 7.0%), or a polytetramethylene ether glycol terminated toluene diisocyanate prepolymer. A preferred polypropylene glycol terminated toluene diisocyanate prepolymer is available from Uniroyal Chemical Company of Middlebury, Conn., under the tradename ADIPRENE® LFG960. A preferred polytetramethylene ether glycol terminated toluene diisocyanate prepolymer (NCO content 5%) is available from Uniroyal Chemical Company of Middlebury, Conn., under the tradename ADIPRENE® LF930. Another toluene diisocyanate prepolymer is a polytetramethylene ether glycol terminated toluene diisocyanate prepolymer (NCO content 6%) available from Uniroyal Chemical Company of Middlebury, Conn., under the tradename ADIPRENE® LF950. The use of multiple polyurethane prepolymers is set forth in U.S. Pat. No. 6,190,268, entitled Golf Ball With A Polyurethane Cover, filed on Jul. 27, 1999, assigned to Callaway Golf Company, and which is hereby incorporated by reference in its entirety.

An alternative polyurethane prepolymer is a para-phenylene diisocyanate-based polyurethane prepolymer such as para-phenylene diisocyanate terminated polyester prepolymer, which is available from Uniroyal Chemical under the tradename ADIPRENE® LFPX 2950, or para-phenylene diisocyanate terminated polyether prepolymer, which is available from Uniroyal Chemical under the tradename ADIPRENE® LFPX 950.

The ratio of the polyurethane prepolymer to curative is determined by the nitrogen-carbon-oxygen group ("NCO") content of the polyurethane prepolymer. For example, the NCO content of the polypropylene glycol terminated toluene diisocyanate prepolymer is preferably in the range of 3.0% to 6.0%, more preferably in the range of 4.0% to 5.75%, and most preferably 5.70%. The NCO content of the polytetramethylene ether glycol terminated toluene diisocyanate prepolymer is preferably in the range of 3.75% to 7.0%, more preferably in the range of 4.0% to 6.5%, and most preferably 5% or 6%. The weight ratio of the polyurethane prepolymer to the curative is preferably in the range of about 10:1 to about 30:1.

Prior to curing, the polyurethane prepolymer and curative blend are preferably stored separately. In general, the polyurethane material is formed by first heating and mixing the curative blend. Then, the polyurethane prepolymer and the curative blend are mixed in a chamber. The mixture from the chamber is dispensed into a hemispherical cavity prior to insertion of a golf ball precursor product. The pre-polyurethane material is cured by applying heat and pressure for a predetermined time period. A more specific process is set forth below.

The polyurethane prepolymer is preferably degassed and warmed in a first holding container. The processing temperature for the polyurethane prepolymer is preferably in the range of about 70–130° F., and most preferably in the range of about 80–120° F., The polyurethane prepolymer is preferably flowable from the first holding container to a mixing chamber in a range of about 200–1100 grams of material per minute, or as needed for processing. In addition, the polyurethane prepolymer may be agitated in the first holding container, in the range of 0–250 rpm, to maintain a more even distribution of material and to eliminate crystallization.

The curative blend is degassed and warmed in a second holding container. The processing temperature for the curative blend is preferably in the range of about 50–230° F., and more preferably in the range of about 80–210° F., and most preferably in the range of about 170–190° F. The curative is preferably flowable from the second holding container to the mixing chamber in the range of about 15–75 grams of material per minute, or as needed. Additives may be added to the curative blend as desired.

The polyurethane prepolymer and curative blend are preferably added to the common mixing chamber at a temperature in the range of about 160–220° F. A colorant material, such as, for example, titanium dioxide, barium sulfate, and/or zinc oxide in a glycol or castor oil carrier, and/or other additive material(s) as are well known in the art, may be added to the common mixing chamber. The amount of colorant material added is preferably in the range of about 0–10% by weight of the combined polyurethane prepolymer and curative materials, and more preferably in the range of about 2–8%. Other additives, such as, for example, polymer fillers, metallic fillers, and/or organic and inorganic fillers (e.g. polymers, balata, ionomers, etc.) may be added as well to increase the specific gravity of the polyurethane material. The entire mixture is preferably agitated in the mixing chamber in the range of about 1 to 250 rpm prior to molding. A more detailed explanation of one aspect of the process is set forth in U.S. Pat. No. 6,200,512, entitled Golf Balls And Methods Of Manufacturing The Same, filed on Apr. 20, 1999, assigned to Callaway Golf Company, and which is hereby incorporated by reference in its entirety. A more detailed explanation of the casting system is set forth in U.S. Pat. No. 6,395,218, entitled Method For Forming A Thermoset Golf Ball Cover, filed on Feb. 1, 2000, assigned to Callaway Golf Company, and which is hereby incorporated by reference in its entirety.

The core 12 of the golf ball 10 is generally composed of a blend of a base rubber, a cross-linking agent, a free radical initiator, and one or more fillers or processing aids. A preferred base rubber is a polybutadiene having a cis-1,4 content above 90%, and more preferably 98% or above.

The use of cross-linking agents in a golf ball core is well known, and metal acrylate salts are examples of such cross-linking agents. For example, metal salt diacrylates, dimethacrylates, or mono(meth)acrylates are preferred for use in the golf ball cores of the present invention, and zinc diacrylate is a particularly preferred cross-linking agent. A commercially available suitable zinc diacrylate is SR-416 available from Sartomer Co., Inc., Exton, Pa. Other metal salt di- or mono-(meth)acrylates suitable for use in the present invention include those in which the metal is calcium or magnesium. In the manufacturing process it may be beneficial to pre-mix some cross-linking agent(s), such as, e.g., zinc diacrylate, with the polybutadiene in a master batch prior to blending with other core components.

Free radical initiators are used to promote cross-linking of the base rubber and the cross-linking agent. Suitable free radical initiators for use in the golf ball core 12 of the present invention include peroxides such as dicumyl peroxide, bis-(t-butyl peroxy) diisopropyl benzene, t-butyl perbenzoate, di-t-butyl peroxide, 2,5-dimethyl-2,5-di-5-butylperoxy-hexane, 1,1-di (t-butylperoxy) 3,3,5-trimethyl cyclohexane, and the like, all of which are readily commercially available.

Zinc oxide is also preferably included in the core formulation. Zinc oxide may primarily be used as a weight adjusting filler, and is also believed to participate in the cross-linking of the other components of the core (e.g. as a coagent). Additional processing aids such as dispersants and activators may optionally be included. In particular, zinc stearate may be added as a processing aid (e.g. as an activator). Any of a number of specific gravity adjusting fillers may be included to obtain a preferred total weight of the core 12. Examples of such fillers include tungsten and barium sulfate. All such processing aids and fillers are readily commercially available. One tungsten filler is WP102 Tungsten (having a 3 micron particle size) available from Atlantic Equipment Engineers of New Jersey.

Table One below provides the ranges of materials included in the preferred core formulations of the present invention.

| Component | Preferred Range | Most Preferred Range |
|---|---|---|
| Polybutadiene | 100 parts | 100 parts |
| Zinc diacrylate | 20–35 phr | 25–30 phr |
| Zinc oxide | 0–50 phr | 5–15 phr |
| Zinc stearate | 0–15 phr | 1–10 phr |
| Peroxide | 0.2–2.5 phr | 0.5–1.5 phr |
| Filler (e.g. tungsten) | As desired (e.g. 2–10 phr) | As desired (e.g. 2–10 phr) |

In the present invention, the core components are mixed and compression molded in a conventional manner known to those skilled in the art. In a preferred form, the finished core 12 has a diameter of about 1.35 to about 1.64 inches for a golf ball 10 having an outer diameter of 1.68 inches. The core weight is preferably maintained in the range of about 32 to about 40 g. The core PGA compression is preferably maintained in the range of about 50 to 90, and most preferably about 55 to 80.

As used herein, the term "PGA compression" is defined as follows:

*PGA compression value=180−Riehle compression value*

The Riehle compression value is the amount of deformation of a golf ball in inches under a static load of 200 pounds, multiplied by 1000. Accordingly, for a deformation of 0.095 inches under a load of 200 pounds, the Riehle compression value is 95 and the PGA compression value is 85.

If the golf ball 10 has a boundary layer 14, the boundary layer 14 is preferably composed of a thermoplastic material. Suitable thermoplastic materials for the boundary layer 14 include: HYTREL® and/or HYLENE® products from DuPont, Wilmington, Del.; PEBAX® products from Elf Atochem, Philadelphia, Pa.; SURLYN® products from DuPont; and/or ESCOR® or IOTEK® products from Exxon Chemical, Houston, Tex.

The Shore D hardness of the boundary layer 14 preferably ranges from 50 to 75, as measured according to ASTM D-2290. In a most preferred embodiment, the boundary layer 14 has a Shore D hardness in the range of 58–65. One reason for preferring a boundary layer 14 with a Shore D hardness of 75 or lower is to improve the feel of the resultant golf ball. It is also preferred that the boundary layer 14 is composed of a blend of SURLYN® ionomer resins.

SURLYN® 8150, 9150, and 6320 are, respectively, an ionomer resin composed of a sodium neutralized copolymer of ethylene and methacrylic acid, an ionomer resin composed of a zinc neutralized copolymer of ethylene and methacrylic acid, and an ionomer resin composed of a terpolymer of ethylene, methacrylic acid and n-butyl acrylate partially neutralized with magnesium. The optional boundary layer 14 is preferably composed of a blend of these ionomers.

One formulation for the optional boundary layer 14 has 25–50 weight percent SURLYN 8150, 25–50 weight percent SURLYN 9150, and 25–50 weight percent SURLYN 6320. Another formulation for the optional boundary layer 14 has 25–75 weight percent SURLYN 9150, and 25–75 weight percent SURLYN 6320. Those skilled in the pertinent art will recognize that other ionomers may be utilized for the optional boundary layer 14 without departing from the scope and spirit of the present invention. The Shore D hardness of the boundary layer 14 is preferably 50 to 75, more preferably from 55–65 Shore D, and most preferably 58–63 Shore D, as measured according to ASTM-D2240.

The polyurethane material of the present invention preferably has a Shore D hardness ranging from 30 to 60 as measured according to ASTM-D2240, more preferably 40 to 55 Shore D, and most preferably 50 Shore D.

One formulation for the polyurethane material of the present invention is polytetramethylene ether glycol terminated toluene diisocyanate prepolymer (NCO content of 5%), a curative blend comprising 4,4'-methylenebis-(2,6-diethyl)-aniline in an amount of 25 to 75 parts per one hundred parts of the curative blend and N,N'-bis-alkyl-p-phenylenediamine in an amount of 25 to 75 parts per one hundred parts of the curative blend, and 1 to 10 parts of a triol such as trimetholylpropane ("TMP").

Another formulation for the polyurethane material of the present invention is polytetramethylene ether glycol terminated toluene diisocyanate prepolymer (NCO content of 5%), a curative blend comprising 4,4'-methylenebis-(2,6-diethyl)-aniline in an amount of 50 parts per one hundred parts of the curative blend and N,N'-bis-alkyl-p-phenylenediamine in an amount of 50 parts per one hundred parts of the curative blend, and 3 parts TMP.

Yet another formulation for the polyurethane material of the present invention is polyether terminated toluene diisocyanate prepolymer (NCO content of 6%), a curative blend comprising 4,4'-methylenebis-(2,6-diethyl)-aniline in an amount of 55 parts per one hundred parts of the curative blend and N,N'-bis-alkyl-p-phenylenediamine in an amount of 45 parts per one hundred parts of the curative blend, and 3 parts TMP.

Yet another formulation for the polyurethane material of the present invention is polytetramethylene ether glycol terminated toluene diisocyanate prepolymer (NCO content of 5%), a curative blend comprising 4,4'-methylenebis-(2,6-diethyl)-aniline in an amount of 65 parts per one hundred parts of the curative blend and N,N'-bis-alkyl-p-phenylenediamine in an amount of 35 parts per one hundred parts of the curative blend, and 3 parts TMP.

Yet another formulation for the polyurethane material of the present invention is polytetramethylene ether glycol terminated toluene diisocyanate prepolymer (NCO content of 5%), a curative blend comprising 4,4'-methylenebis-(2,6-diethyl)-aniline in an amount of 25 to 75 parts per one hundred parts of the curative blend and N,N'-dialkylamino-diphenylmethane with tetrapropoxylated ethylenediamine in an amount of 25 to 75 parts per one hundred parts of the curative blend, and 1 to 10 parts of a triol such as trimetholylpropane ("TMP").

Another formulation for the polyurethane material of the present invention is polytetramethylene ether glycol terminated toluene diisocyanate prepolymer (NCO content of 5%), a curative blend comprising 4,4'-methylenebis-(2,6-diethyl)-aniline in an amount of 50 parts per one hundred parts of the curative blend and N,N'-dialkylamino-diphenylmethane with tetrapropoxylated ethylenediamine in an amount of 50 parts per one hundred parts of the curative blend, and 3 parts TMP.

Yet another formulation for the polyurethane material of the present invention is polyether terminated toluene diisocyanate prepolymer (NCO content of 6%), a curative blend comprising 4,4'-methylenebis-(2,6-diethyl)-aniline in an amount of 55 parts per one hundred parts of the curative blend and N,N'-dialkylamino-diphenylmethane with tetrapropoxylated ethylenediamine in an amount of 45 parts per one hundred parts of the curative blend, and 3 parts TMP.

Yet another formulation for the polyurethane material of the present invention is polytetramethylene ether glycol terminated toluene diisocyanate prepolymer (NCO content of 5%), a curative blend comprising 4,4'-methylenebis-(2,6-diethyl)-aniline in an amount of 65 parts per one hundred parts of the curative blend and N,N'-dialkylamino-diphenylmethane with tetrapropoxylated ethylenediamine in an amount of 35 parts per one hundred parts of the curative blend, and 3 parts TMP.

Yet another formulation for the polyurethane material of the present invention is polytetramethylene ether glycol terminated toluene diisocyanate prepolymer (NCO content of 5%), a curative blend comprising 4,4'-methylenebis-(2,6-diethyl)-aniline in an amount of 25 to 75 parts per one hundred parts of the curative blend and an aliphatic diamine in an amount of 25 to 75 parts per one hundred parts of the curative blend, and 1 to 10 parts of a triol such as trimetholylpropane ("TMP").

The preferred construction of a golf ball 10 utilizing the polyurethane material of the present invention is a three-piece solid golf ball having a solid polybutadiene core 12, a boundary layer 14 composed of a blend of ionomers, and a cover 16 composed of the polyurethane material of the present invention. The core 12 is preferably compression molded, the boundary layer 14 is preferably injection molded, and the cover 16 is preferably cast. The golf ball 10 may be finished with one or two layers of a base white coating, a clear coating and an indicia.

The thickness of the cover 16 preferably ranges from 0.010 inch to 0.070 inch, more preferably ranges from 0.014 inch to 0.050 inch, even preferably ranges from 0.015 inch to 0.044 inch, most preferably ranges from 0.025 inch to 0.040 inch, and is most preferably 0.030 inch. The boundary layer 14 is preferably injection molded and preferably ranges in thickness from 0.040 inch to 0.090 inch, more preferably from 0.045 inch to 0.070 inch, and most preferably from 0.050 inch to 0.060 inch. The boundary layer 14 may also be compression molded from half shells. The core 12 preferably has a diameter of between 1.35 inches and 1.60 inches, more preferably between 1.45 inches and 1.55 inches, and most preferably 1.49 inches. The core 12 preferably has a PGA compression ranging from 70–110 points, and most preferably 100 points. A more detailed description of a construction and performance properties of a golf ball utilizing the polyurethane material of the present invention is set forth in U.S. Pat. No. 6,443,858, for a Golf Ball With A High Coefficient Of Restitution, filed on Jun. 8, 2001, assigned to Callaway Golf Company, and U.S. Pat. No. 6,478,697 for a Golf Ball With A High Coefficient Of Restitution, filed on Oct. 19, 2001, assigned to Callaway Golf Company, both of which are hereby incorporated by reference in their entireties.

The Shore D hardness of the golf ball 10, as measured on the golf ball, is preferably between 40 Shore D points to 75 Shore D points, and most preferably between 50 Shore D points and 65 Shore D points. The hardness of the golf ball 10 is measured using an Instron Shore D Hardness measurement device wherein the golf ball 10 is placed within a holder and the pin is lowered to the surface to measure the hardness. The average of five measurements is used in calculating the ball hardness. The ball hardness is preferably measured on a land area of the cover 14. The preferred overall diameter of the golf ball 10 is approximately 1.68 inches, and the preferred mass is approximately 45.5 grams. However, those skilled in the pertinent art will recognize that the diameter of the golf ball 10 may be smaller (e.g. 1.65 inches) or larger (e.g. 1.70 inches) without departing from the scope and spirit of the present invention. Further, the mass may also vary without departing from the scope and spirit of the present invention.

The surface geometry of the golf ball 10 is preferably a conventional dimple pattern such as disclosed in U.S. Pat. No. 6,213,898 for a Golf Ball With An Aerodynamic Surface On A Polyurethane Cover, which pertinent parts are hereby incorporated by reference. Alternatively, the surface geometry of the golf ball 10 may have a non-dimple pattern such as disclosed in U.S. Pat. No. 6,290,615 filed on Nov. 18, 1999 for A Golf Ball Having Tubular lattice Pattern, which pertinent parts are hereby incorporated by reference.

The polyurethane material of the present invention provides a golf ball cover 16 with greater durability than most other polyurethane covers. Cover durability is determined according to the following procedure. A CALLAWAY GOLF® STEELHEAD™ X-14® PRO SERIES sand wedge was used on a GOLF LABS robot to strike twelve golf balls per sample twice (the balls were hit on each side) and to strike six control golf balls twice. The golf ball is placed on a tee with the pole positioned for impact with the club. The impact area is sprayed with water. The robot is triggered, the club is swung at approximately 72 miles per hour, and the wet golf ball is struck. The golf ball retrieved and placed on the tee with the opposite side of the pole positioned for impact and sprayed with water. The robot is triggered and the wet golf ball is again struck. The club face and grooves of the sand wedge are cleaned and dried prior to each hit. The golf ball is retrieved and examined under a stereoscopic microscope for evaluation and ranking. The results are analyzed using statistics with a 95% confidence level.

The cover durability is ranked according to the following criteria:

1 Portion of cover has been completely sheared off. Dimples (or other surface geometry) have been reduced or greatly removed;

2 Cover material has been sheared to the extent that flaps of cover are visible, but not severe enough to completely shear off and remove dimples;

3 Moderate cutting of the cover material is evident to the extent that internal portions of the cover are exposed, but the cover is still intact;

3.5 Slight cutting of the cover material is evident with little or no internal portions of the cover exposed, bunching of the cover is apparent from a side or profile view;

3.75 Slight cutting of the cover material is evident with little or no internal portions of the cover exposed, and no bunching of the cover is apparent from a side or profile view;

4 Indentations in the cover are evident, but there is no bunching of the cover material;

4.5 Groove marks are clearly defined, but no deformation of the cover material is apparent;

5 Groove marks are difficult to see and slight score marks may be visible, but the finish is not cracked or broken and there is no damage to the cover material.

Golf balls utilizing the polyurethane material of the present invention were compared to the CALLAWAY GOLF® CTU30™ BLUE golf ball, the CALLAWAY GOLF® CTU30™ RED golf ball, the TITLEIST® PROV1™ golf ball and the MAXFLI® A10 golf ball, all of which have thermosetting polyurethane covers. The CTU30™ RED golf ball had a 2.42 ranking, the CTU30™ BLUE golf ball had a 2.69 ranking, the PROV1™ golf ball had a 2.63 ranking and the A10™ golf ball had a 2.58 ranking. The golf balls that utilized the polyurethane cover of the present invention had a ranking ranging from 2.89 to 3.34.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

What is claimed is:

1. A golf ball comprising:

a core comprising a polybutadiene mixture;

a boundary layer formed over the core; and a cover formed over the boundary layer, the cover composed of a thermosetting polyurethane material formed from reactants comprising a polyester glycol terminated toluene diisocyanate prepolymer with a —NCO group content ranging from 3.0% to 7.0% and a curative blend consisting essentially of 4,4'-methylenebis-(2,6-diethyl-aniline) in an amount of 65 parts per one hundred parts of the curative blend and N,N'-bis-alkyl-p-phenylenediamine with tetrapropoxylated ethylenediamine in an amount of 35 parts per one hundred parts of the curative blend;

wherein the cover has an aerodynamic surface geometry thereon.

* * * * *